(12) United States Patent
Lin et al.

(10) Patent No.: US 9,434,809 B2
(45) Date of Patent: Sep. 6, 2016

(54) ISOCYANATE-TERMINATED PREPOLYMER, THE METHOD FOR PREPARING THE SAME AND THE USE THEREOF

(71) Applicant: Bayer MaterialScience AG, Leverkusen (DE)

(72) Inventors: Jen-Chieh Lin, Shanghai (CN); HoChien Kung, Hsinchu (TW); Hong Zhu, Shanghai (CN)

(73) Assignee: Covestro Deutschland AG (DE)

( * ) Notice: Subject to any disclaimer, the term of this patent is extended or adjusted under 35 U.S.C. 154(b) by 137 days.

(21) Appl. No.: 13/768,430

(22) Filed: Feb. 15, 2013

(65) Prior Publication Data

US 2013/0165544 A1 Jun. 27, 2013

Related U.S. Application Data

(63) Continuation of application No. 13/567,575, filed on Aug. 6, 2012, now abandoned, which is a continuation of application No. 13/391,920, filed as application No. PCT/EP2010/004891 on Aug. 11, 2010, now abandoned.

(30) Foreign Application Priority Data

Aug. 24, 2009 (CN) .......................... 2009 1 0194469

(51) Int. Cl.
| | | |
|---|---|---|
| *C08G 18/76* | (2006.01) | |
| *C08G 18/08* | (2006.01) | |
| *C08G 18/12* | (2006.01) | |
| *C08G 101/00* | (2006.01) | |

(52) U.S. Cl.
CPC ............ *C08G 18/7657* (2013.01); *C08G 18/12* (2013.01); *C08G 18/14* (2013.01); *C08G 18/7664* (2013.01); *C08G 18/7671* (2013.01); *C08G 2101/0008* (2013.01); *C08G 2101/0083* (2013.01)

(58) Field of Classification Search
CPC ...... C08G 18/12; C08G 18/14; C08G 18/40; C08G 18/6564; C08G 18/6674; C08G 18/7657; C08G 18/7664; C08G 18/7671; C08J 2205/06
See application file for complete search history.

(56) References Cited

U.S. PATENT DOCUMENTS

| | | | | | |
|---|---|---|---|---|---|
| 4,261,852 | A | * | 4/1981 | Carroll et al. ........... | 252/182.22 |
| 4,365,025 | A | * | 12/1982 | Murch et al. ................. | 521/159 |
| 5,091,437 | A | * | 2/1992 | Lunardon et al. ............ | 521/159 |
| 5,877,227 | A | * | 3/1999 | Murty ........................... | 521/159 |
| 2006/0058408 | A1 | * | 3/2006 | Sam et al. .................... | 521/155 |
| 2007/0282028 | A1 | | 12/2007 | Harre et al. | |

FOREIGN PATENT DOCUMENTS

| | | |
|---|---|---|
| EP | 1201695 A1 | 5/2002 |
| WO | WO 02/068492 A1 | 9/2002 |

OTHER PUBLICATIONS

International Search Report for PCT/EP2010/004891 dated Feb. 23, 2011.

* cited by examiner

*Primary Examiner* — John Cooney
(74) *Attorney, Agent, or Firm* — Drinker Biddle & Reath LLP

(57) ABSTRACT

The present invention pertains to the field of polyurethane, especially relates to an isocyanate-terminated prepolymer, the method for preparing the same and the use thereof. The present invention adjusts the reaction components and the ratios thereof to obtain an isocyanate-terminated prepolymer suitable for preparing flexible polyurethane foam under a relative low mold temperature. The method for preparing flexible polyurethane foam by using the isocyanate-terminated prepolymer provided in this present invention can reduce the mold temperature, production time and energy consumption, as well as to obtain a polyurethane flexible foam processing good physical and mechanical properties.

6 Claims, No Drawings

ISOCYANATE-TERMINATED PREPOLYMER, THE METHOD FOR PREPARING THE SAME AND THE USE THEREOF

RELATED APPLICATIONS

This application is a continuation application of U.S. patent application Ser. No. 13/567,575, filed Aug. 6, 2012, which is a continuation application of U.S. patent application Ser. No. 13/391,920, filed Feb. 23, 2012, which is a U.S. national stage application (under 35 U.S.C. §371) of PCT/EP2010/004891, filed Aug. 11, 2010, which claims benefit of Chinese Application No. 200910194469.2, filed Aug. 24, 2009.

TECHNICAL FIELD

The present invention pertains to the field of polyurethane, especially relates to an isocyanate-terminated prepolymer, the method for preparing the same and the use thereof.

BACKGROUND

It is well known that polyurethane flexible foams, which possess good physical properties, good mechanical properties and comfortable tactility, are widely used to prepare padding material, textile composite material and sound insulation material. Especially, in the padding industry, the auto parts, furniture and fitting made by polyurethane flexible foams possess the advantages of low-weight, good flexibility, good impact strength and comfortable tactility.

Generally, polyurethane flexible foams are produced by reacting isocyanate with polyols. The methods for preparing polyurethane flexible foams include one-step route and prepolymer route. For example, CN1130410C disclosed a method for preparing high resilience polyurethane flexible foams by reacting MDI composition with polyol composition. CN1047179C disclosed a method for preparing a polyurethane flexible foams by reacting high content 4,4'-MDI and the liquid variants thereof with polyol composition. CN100354330C disclosed a method for preparing middle-low density polyurethane foams by modified MDI-based isocyanate composition. CN1307226C disclosed a method for preparing polyurethane flexible foams by reacting isocyanate having high 4,4'-MDI content with polyoxyethylene-polyoxypropelene polyol.

Nevertheless, the mold temperature of the aforementioned methods for preparing polyurethane flexible foams shall be controlled at 65±5° C. If the mold temperature is too low, peel skin and/or coarse skin, which significantly reduce the quality of the foam surface, will be caused. In addition, the low mold temperature will slow the reaction rate, extend the demolding time which will reduce the production efficiency significantly.

As known to all, the process for preparing polyurethane flexible foams required a mold which can be heated, however, such kind of mold cost a lot of investment and energy. Therefore, the industry had committing itself to develop a new polyurethane flexible foam and the method for preparing the same to reduce the mold temperature, production time and energy consumption, as well as to obtain a polyurethane flexible foam processing good physical and mechanical properties.

CONTENTS OF INVENTION

The objective of this invention is to provide an isocyanate-terminated prepolymer. According to an example of the present invention, the isocyanate-terminated prepolymer comprises the reaction product of reaction components of a1, a2 and a3:

a1) 45-65% by weight of diphenylmethane diisocyanate (MDI), based on 100% by weight of the isocyanate-terminated prepolymer, wherein the diphenylmethane diisocyanate (MDI) comprises 50-79% by weight of 4,4'-diphenylmethane diisocyanate, based on 100% by weight of the diphenylmethane diisocyanate (MDI), a2) 25-45% by weight of polymethylene polyphenyl polyisocyanate (PMDI), based on 100% by weight of the isocyanate-terminated prepolymer, and a3) 5-20% by weight of polyether polyol, based on 100% by weight of the isocyanate-terminated prepolymer, wherein the average functionality of the polyether polyol is 2-6, the average molecular weight is 2000-10000, the average ethylene oxide content of the polyether polyol is 22-43% by weight, based on 100% by weight of the polyether polyol, wherein, the NCO content of the isocyanate-terminated prepolymer is 27-30% by weight, based on 100% by weight of the isocyanate-terminated prepolymer.

Preferably, the diphenylmethane diisocyanate (MDI) comprises 70-79% by weight of 4,4'-diphenylmethane diisocyanate, based on 100% by weight of the diphenylmethane diisocyanate (MDI).

Preferably, the polymethylene polyphenyl polyisocyanate (PMDI) comprises:

a21) 0-60% by weight of first polymethylene polyphenyl polyisocyanate having a general formula (I), based on 100% by weight of the polymethylene polyphenyl polyisocyanate,

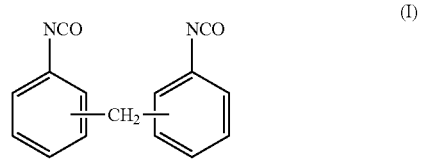

and a22) 40-100% by weight of a second polymethylene polyphenyl polyisocyanate having a general formula (II), based on 100% by weight of the polymethylene polyphenyl polyisocyanate,

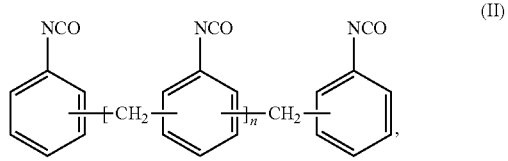

wherein n is an integer equal to or more than 1.

Preferably, the average ethylene oxide content of the polyether polyol is 23-37% by weight, based on 100% by weight of the polyether polyol.

Another objective of this invention is to provide a method for preparing an isocyanate-terminated prepolymer. According to an example of the present invention, the method for preparing an isocyanate-terminated prepolymer comprising the step of reacting components of a1, a2 and a3:

a1) 45-65% by weight of diphenylmethane diisocyanate (MDI), based on 100% by weight of the isocyanate-terminated prepolymer, wherein the diphenylmethane diisocyanate (MDI) comprises 50-79% by weight of 4,4'-diphenylmethane diisocyanate, based on 100% by weight of the diphenylmethane diisocyanate (MDI), a2) 25-45% by weight of polymethylene polyphenyl polyisocyanate (PMDI), based on 100% by weight of the isocyanate-terminated prepolymer, and a3) 5-20% by weight of polyether polyol, based on 100% by weight of the isocyanate-terminated prepolymer, wherein the average functionality of the polyether polyol is 2-6, the average molecular weight is 2000-10000, the average ethylene oxide content of the polyether polyol is 22-43% by weight, based on 100% by weight of the polyether polyol, wherein the NCO content of the isocyanate-terminated prepolymer is 27-30% by weight, based on 100% by weight of the isocyanate-terminated prepolymer.

Preferably, the diphenylmethane diisocyanate (MDI) comprises 70-79% by weight of 4,4'-diphenylmethane diisocyanate, based on 100% by weight of the diphenylmethane diisocyanate (MDI).

Preferably, the polymethylene polyphenyl polyisocyanate (PMDI) comprises:

a21) 0-60% by weight of first polymethylene polyphenyl polyisocyanate having a general formula (I), based on 100% by weight of the polymethylene polyphenyl polyisocyanate,

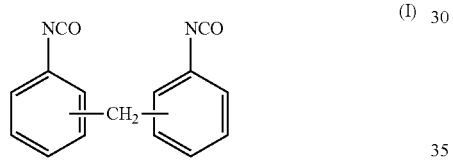

and a22) 40-100% by weight of a second polymethylene polyphenyl polyisocyanate having a general formula (II), based on 100% by weight of the polymethylene polyphenyl polyisocyanate,

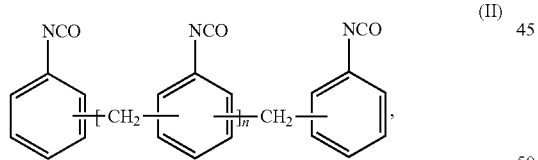

wherein n is an integer equal to or more than 1.

Preferably, the average ethylene oxide content of the polyether polyol is 23-37% by weight, based on 100% by weight of the polyether polyol.

Another objective of this invention is to provide a use of the isocyanate-terminated prepolymer provided in the present invention to prepare flexible polyurethane foam.

Another objective of this invention is to provide a flexible polyurethane foam. According to an example of the present invention, the flexible polyurethane foam comprises the reaction product of reaction components of A, B and C:

A) the isocyanate-terminated prepolymer provided in the present invention,

B) polyol, comprising b1) 0.1-20 weight parts of at least a first polyoxyethylene-polyoxypropylene polyol, based on 100% by weight of B and C, wherein the functionality of the first polyoxyethylene-polyoxypropylene polyol is equal to or more than 2, and the average ethylene oxide content of the first polyoxyethylene-polyoxypropylene polyol is equal to or more than 50% by weight, b2) 30-90 weight parts of a second polyoxyethylene-polyoxypropylene polyol, based on 100% by weight of B and C, wherein the hydroxyl value of the second polyoxyethylene-polyoxypropylene polyol is 25-40 mg/KOH, and the average ethylene oxide content of the second polyoxyethylene-polyoxypropylene polyol is equal to or less than 30% by weight, b3) 5-60 weight parts of polymer polyol, b4) 0.01-15 weight parts of chain extender, b5) 0.01-20 weight parts of catalyst and/or foam stabilizer, and C) 0.1-7 weight parts of water, wherein the NCO index of the reaction is 70-120.

Preferably, the reaction is carried out in a mold, and the mold temperature is 15-40° C.

Another objective of this invention is to provide a method for preparing the flexible polyurethane foam provided in the present invention. According to an example of the present invention, the method for preparing a flexible polyurethane foam comprising the step of reacting components of A, B and C:

A) the isocyanate-terminated prepolymer of isocyanate as claimed in Claim 1-4,

B) polyol, comprising b1) 0.1-20 weight parts of at least a first polyoxyethylene-polyoxypropylene polyol, based on 100% by weight of B and C, wherein the functionality of the first polyoxyethylene-polyoxypropylene polyol is equal to or more than 2, and the average ethylene oxide content of the first polyoxyethylene-polyoxypropylene polyol is equal to or more than 50% by weight, b2) 30-90 weight parts of a second polyoxyethylene-polyoxypropylene polyol, based on 100% by weight of B and C, wherein the hydroxyl value of the second polyoxyethylene-polyoxypropylene polyol is 25-40 mg/KOH, and the average ethylene oxide content of the second polyoxyethylene-polyoxypropylene polyol is equal to or less than 30% by weight, b3) 5-60 weight parts of polymer polyol, b4) 0.01-15 weight parts of chain extender, b5) 0.01-20 weight parts of catalyst and/or foam stabilizer, and C) 0.1-7 weight parts of water, wherein the NCO index of the reaction is 70-120.

Preferably, the reaction is carried out in a mold, and the mold temperature is 15-40° C.

Another objective of this invention is to provide a use of the flexible polyurethane foam provided in the present invention to prepare furniture, cushion or automobile.

The present invention adjusts the reaction components and the ratios thereof to obtain an isocyanate-terminated prepolymer suitable for preparing a flexible polyurethane foam under a relative low mold temperature. The method for preparing flexible polyurethane foam by using the isocyanate-terminated prepolymer provided in this present invention can reduce the mold temperature, production time and energy consumption, as well as to obtain a polyurethane flexible foam processing good physical and mechanical properties.

MODE OF CARRYING OUT THE INVENTION

Isocyanate-Terminated Prepolymer

The present invention adjusts the reaction components and the ratios thereof to obtain an isocyanate-terminated prepolymer suitable for preparing flexible polyurethane foam under a relative low mold temperature.

The isocyanate-terminated prepolymer comprises the reaction product of reaction components of a1, a2 and a3.

The a1 is diphenyl-methane-diisocyanate (MDI). The diphenyl-methane-diisocyanate (MDI) comprises 50-79% by weight, preferably 60-79% by weight, more preferably 70-79% by weight, of 4,4'-diphenyl-methane-diisocyanate, based on 100% by weight of the diphenyl-methane-diisocyanate (MDI). In addition, the diphenyl-methane-diisocyanate (MDI) can further comprise 2,4'-MDI and/or modified MDI. The modified MDI can be selected from, but not limited to, carbodiimide, uretonimine, urethane, methyl isocyanurate, urea modified MDI, biuret modified MDI or ethyl allophanate modified MDI.

The amount of a1 is 45-65% by weight, based on 100% by weight of the isocyanate-terminated prepolymer.

The a2 is polymethylene-polyphenyl-polyisocyanate (PMDI). The said PMDI is the mixture of diphenyl-methane-diisocyanate and its homologues. The functionality of the homologues is more than 2. The average functionality of the polymethylene-polyphenyl-polyisocyanates is 2.6-2.8.

The general formula of the polymethylene-polyphenyl-polyisocyanate (PMDI) is:

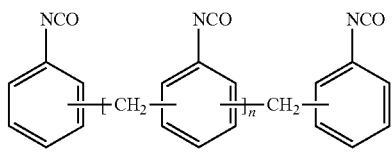

wherein n is an integer more than or equal to 0.

Preferably, the polymethylene-polyphenyl-polyisocyanate (PMDI) comprises:

a21) 0-60% by weight of a first polymethylene polyphenyl polyisocyanate having a general formula (I), based on 100% by weight of the polymethylene polyphenyl polyisocyanate,

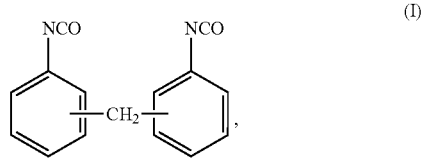

and a22) 40-100% by weight of a second polymethylene polyphenyl polyisocyanate having a general formula (II), based on 100% by weight of the polymethylene polyphenyl polyisocyanate,

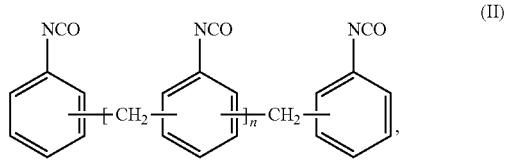

wherein n is an integer equal to or more than 1.

The polymethylene-polyphenyl-polyisocyanate can be selected from, but not limited to, Desmodur® 44V20 (available from Bayer).

The amount of a2 is 25-45% by weight, based on 100% by weight of the isocyanate-terminated prepolymer.

The a3 is polyether polyol. The polyether polyol can be selected from, but not limited to, polyoxyethylene-polyoxypropelene polyol, polyoxypropelene polyol or vegetable oil polyol, more preferably polyoxyethylene-polyoxypropelene polyol, polyoxypropelene polyol, most preferably polyoxyethylene-polyoxypropelene polyol. The average functionality of the polyether polyol is 2-6, preferably 3-5, more preferably 3-4, the average molecular weight of the polyether polyol is 2000-10000, preferably 3000-8000, more preferably 4000-7000, the average oxyethylene content is 22-43% by weight, preferably 23-37% by weight, based on 100% by weight of the polyether polyol.

The a3 can be one polyether polyol or a mixture of polyether polyol. For example, a3 can be obtained by mixing 36.3 weight parts of a polyol having average OH value of 37, average functionality of 3, average molecular weight 4549 and average oxyethylene content of 73%, and 63.7 weight parts of a polyol having average OH value of 31.5, average functionality of 3.9, average molecular weight 6900 and average oxyethylene content of 17.5%. The average functionality of the obtained a3 is 3.6, the average molecular weight of the obtained a3 is 6051 and the average oxyethylene content of the obtained a3 is 37.7%, based on 100% by weight of the polyether polyol.

The amount of the a3 is 5-20 by weight, based on 100 by weight of the isocyanate-terminated prepolymer.

The NCO content of the isocyanate-terminated prepolymer is 27-30% by weight, based on 100 by weight of the isocyanate-terminated prepolymer.

Method for Preparing the Isocyanate-Terminated Prepolymer

The isocyanate-terminated prepolymer can be prepared by the below methods:

Method 1: Introducing a1 and a2 into the reaction kettle, then introducing a3 into the kettle, mixing and reacting with a1 and a2, the reaction temperature is 60-90° C., a final product can be obtained after the reaction comes to the end.

Method 2: Introducing a1 and a3 into the reaction kettle, reacting a1 with a3 under the reaction temperature of 60-90° C., then introducing a2 into the reaction kettle after the reaction is finished, mixing a2 with the reactant of a1 and a3 in the reaction kettle at a temperature of 50-80° C., a final product can be obtained after the mixing is finished.

Method 3: Introducing 65-85% by weight, preferably 70-80% by weight, most preferably 73% by weight, of 4,4'-MDI and a2 into the kettle, based on 100% by weight of the 4,4'-MDI comprised in a1, reacting at a reaction temperature of 60-90° C., when the reaction is finished, introducing the rest of the MDI comprised in a1 and a3 into the kettle, mixing, a final product is obtained after the mixing is finished.

Flexible Polyurethane Foam

The isocyanate-terminated prepolymer (Component A) provided in the present invention can be reacted with polyol (Component B and C) at a relative low mold temperature to obtain a flexible polyurethane foam by using fewer energy consumption and fewer demold time. The obtained flexible polyurethane foam possesses good physical and mechanical properties.

The component A refers to the part of Isocyanate-terminated prepolymer in the description.

The component B comprises a first polyoxyethylene-polyoxypropelene polyol, a second polyoxyethylene-polyoxypropelene polyol, polymer polyol, chain extender, catalyst, and/or foam stabilizer.

The functionality of the first polyoxyethylene-polyoxypropelene polyol is 2-6, preferably 3-5, most preferably 3-4, the average oxyethylene content of the first polyoxyethylene-polyoxypropelene polyol is more than or equal to 50% by weight, preferably 50-90% by weight, most preferably 60-80% by weight, based on 100% by weight of the first polyoxyethylene-polyoxypropelene polyol. The amount of the first polyoxyethylene-polyoxypropelene-polyol is 0.1-20 weight parts, preferably 0.1-10 weight parts, most preferably 0.1-7 weight parts.

The average OH value of the second polyoxyethylene-polyoxypropylene polyol is 25-40 mg/KOH, the average oxyethylene content of the second polyoxyethylene-polyoxypropelene polyol is less than or equal to 30% by weight, based on 100% by weight of the second polyoxyethylene-polyoxypropelene polyol. The amount of the second polyoxyethylene-polyoxypropelene-polyol is 30-90 weight parts, preferably 40-90 weight parts, more preferably 50-80 weight parts, most preferably 60-70 weight parts.

The polymer polyol comprises polymer solids. The polymer solids can be selected from, but not limited to, polyacrylonitrile, polystyrene, polyvinyl chloride or their copolymers. The average molecular weight of the polymer polyol can be selected from, but not limited to, 3000-25000, preferably 4000-20000, more preferably 5000-15000. The average functionality of the polymer polyol can be selected from, but not limited to, 2-6, preferably 3-5, more preferably 3-4. The amount of the polymer polyol is 5-60 weight parts, preferably 10-50 weight parts, more preferably 20-40 weight parts.

The chain extender is OH-based and/or amine-based chain extender. The average molecular weight of the OH-based and/or amine-based chain extender is less than or equal to 1000. The chain extender can be selected from, but not limited to, triethanolamine, diethanolamine, glycol, glycerine, trimethylolpropane, diethylene triamine, diethyl toluene diamine or dimethylmercaptotoluene diamine. The amount of the chain extender is 0.01-15 weight parts.

The catalysts can be selected from, but not limited to, amine-based catalyst or metal-based catalyst.

The foam stabilizer can be selected from, but not limited to, silicane foam stabilizer.

The amount of the catalyst and/or the foam stabilizer is 0.01-20 weight parts.

The component B can further comprise other additives, preferably but not limited to flame retardants, color paste or fillings.

The component C is water. The amount of the water is 0-7 weight parts, preferably 1-5 weight parts, more preferably 2-6 weight parts.

Method for Preparing the Flexible Polyurethane Foam

Reacting the component A, B and C in the mold to obtain the flexible polyurethane foam.

The mold can be selected from, but not limited to, the mold in the prior art used for preparing the flexible polyurethane foam.

The reaction temperature in the mold is 15-40° C.

The NCO index of the reaction is 70-120. The definition of the NCO Index is as below:

$$X(\%) = \frac{\left[\begin{array}{c}\text{The moles of the isocyanate group} \\ \text{in the component } A\end{array}\right] \times 100\%}{\left[\begin{array}{c}\text{The moles of the reactant groups in component } B \\ \text{which can be reacted with the isocyanate group}\end{array}\right]}$$

The Use of the Flexible Polyurethane Foam

The flexible polyurethane foam can be used to prepare furniture, cushion or automobile fittings.

The Materials Mentioned in this Context are Illustrated as Follows:

| | | |
|---|---|---|
| Desmodur ® 44V20 | PMDI, the average NCO content is 31.5% by weight | Available from Bayer |
| Component A4 | Mixture of 4,4'-MDI, 2,4-MDI and PMDI, the average NCO content is 32.5% by weight | Desmodur ® 3133, Available from Bayer |
| Desmodur ® 1806 | MDI mixture of 4,4'-MDI and 2,4'-MDI, wherein, the content of 4,4'-MDI is 40-50% by weight, the content of 2,4'-MDI is 60-50% by weight, based on 100% by weight f the MDI mixture | Available from Bayer |
| Component A5 | MDI prepolymer, the average NCO content is 30% by weight. The MDI prepolymer is obtained by reacted MDI and polyol. The content of the 4,4'-MDI is more than or equal to 80% by weight, based on 100% by weight of the MDI. The average oxyethylene content is less than or equal to 20% by weight, based on 100% by weight of the polyol. | Desmodur ® 20IK45, Available from Bayer |
| Desmodur ® 44M | Pure 4,4'-MDI | Available from Bayer |
| Polyol 1 | polyoxyethylene-polyoxypropelene polyol; OH value is 37 mgKOH/g, oxyethylene content is about 73% by weight | Available from Bayer |
| Polyol 2 | polyoxyethylene-polyoxypropelene polyol; OH value is 31.5 mgKOH/g, oxyethylene content is about 17.5% by weight | Available from Bayer |
| Polyol 3 | polyoxyethylene-polyoxypropelene polyol; OH value is 35 mgKOH/g, average functionality is 3. Oxyethylene content is about 14% by weight | Available from Bayer |
| Polyol 4 | Polymer polyol; OH value is 16.5-20.5 mgKOH/g | Available from Bayer |
| B8715 | Surfactant | Available from Goldschmidt |

| | | |
|---|---|---|
| A1 | Amine-based catalyst | Available from Airproduct |
| A300 | Amine-based catalyst | Available from Airproduct |
| 33LV | Amine-based catalyst | Available from Airproduct |
| DEOA | Diethanolamine | |

EXAMPLE

The examples and the methods disclosed in the present invention are illustrative but not limitative.

Preparation for the Isocyanate-Terminated Prepolymer

Example 1

13 weigh parts of a mixture of polyol 1 and polyol 2 and 30.5 weigh parts of 4,4'-MDI were introduced into a reaction kettle, the mixture was reacted at 75° C. for about 100 minutes. Thereafter, 22 weigh parts of Desmodur® 1806 and 34.5 weigh parts of Desmodur® 44V20 were introduced into the reaction kettle and blended. An isocyanate-terminated prepolymer (A1) having a NCO content of 27.7% by weight was obtained.

Example 2

10 weigh parts of a mixture of polyol 1 and polyol 2 were introduced into another mixture of 30 weigh parts of Desmodur® 44M, 24 weigh parts of Desmodur® 1806 and 36 weigh parts of Desmodur® 44V20, thereafter, 100 ppm 2-chloro acid was added. The reaction was carried out at 75° C. for about 90 minutes. When the reaction was finished, after being cooling down, an isocyanate-terminated prepolymer (A2) having a NCO content of 29.2% by weight was obtained.

Example 3

10 weigh parts of a mixture of polyol 1 and polyol 2 were introduced into 30 weigh parts of 4,4'MDI. The reaction was carried out at 75° C. for about 90 minutes. When the reaction was finished, 24 weigh parts of Desmodur® 1806 and 36 weigh parts of Desmodur® 44V20 were added and mixed. An isocyanate-terminated prepolymer (A3) having a NCO content of 29.2% by weight was obtained.

Preparation for the Flexible Polyurethane Foam

Example 4-6 and Comparative Example C1-C3

Under the reaction condition listed in the table 1, a flexible polyurethane foam was obtained by the reaction between the isocyanate-terminated prepolymer (A1, A2 and A3, respectively) and the component B and C. The physical and mechanical properties of the obtained flexible polyurethane foam were listed in the table 1.

TABLE 1

Preparation of flexible polyurethane foam

| | | Example | | | | | |
|---|---|---|---|---|---|---|---|
| | | 4 | 5 | 6 | C1 | C2 | C3 |
| Component A | | A1 | A2 | A3 | A4 | A4 | A4 |
| Component B | Polyol 3 (wt. %) | 61.6 | 61.6 | 61.6 | 73 | 73 | 73 |
| | Polyol 4 (wt. %) | 34.3 | 34.3 | 34.3 | 27 | 27 | 27 |
| | Polyol 1 (wt. %) | 3.2 | 3.2 | 3.2 | 3 | 3 | 3 |
| | Glycerine (wt. %) | 0.1 | 0.5 | 0.5 | 0.1 | 0.1 | 0.1 |
| | DEOA (wt. %) | 0.38 | 0.3 | 0.3 | 0.6 | 0.6 | 0.6 |
| | A1 (wt. %) | 0.15 | 0.15 | 0.15 | 0.05 | 0.05 | 0.05 |
| | 33LV (wt. %) | 0.3 | 0.5 | 0.5 | 0.25 | 0.25 | 0.25 |
| | Chain extender (wt. %) | 0.23 | 0.23 | 0.23 | 0.25 | 0.25 | 0.25 |
| | A300 (wt. %) | 0.36 | 0.36 | 0.36 | 0.4 | 0.4 | 0.4 |
| | B8715 (wt. %) | 1.01 | 1.01 | 1.01 | 0.8 | 0.8 | 0.8 |
| Component C | Water (wt. %) | 3.65 | 3.65 | 3.65 | 3.6 | 3.6 | 3.6 |
| Reaction condition | Mold temperature (° C.) | 25 | 25 | 25 | 25 | 25 | 60 |
| | Demolding time (min) | 4 | 4 | 4 | 4 | >10 | 4 |
| | NCO Index (%) | 90-95 | 90-95 | 90-95 | 90-95 | 90-95 | 90-95 |
| Physical properties | Density (kg/m³) | 51.5 | 52.6 | 52 | | 52.3 | 52 |
| | IFD 25% (N) | 323 | 388 | 400 | | 280 | 275 |
| | IFD 65% (N) | 853 | 1109 | 1111 | | 820 | 811 |
| | Ball rebound (%) | 55 | 47 | 48 | | 57 | 57 |
| | Tensile strength (kPa) | 132 | 186 | 187 | Peel skin | 168 | 165 |
| | Elongation at break (%) | 85 | 90 | 90 | | 93 | 95 |
| | CFD 40% (Kpa) | 7.3 | 8.8 | 8.9 | | 7.0 | 6.9 |
| | C. S (%) (22 h, 70 C.) | 4.8 | 6.8 | 7.0 | | 3.8 | 3.9 |
| | Wet CS 50% (95%, 50 C.) | 8.1 | 12.1 | 12.3 | | 12 | 12 |

According to Table 1, the prepolymer (A1, A2 or A3) provided in the present invention was reacted with the component B and C to prepare a flexible polyurethane foam with satisfied mechanical properties, wherein the mold temperature was 25° C. and the demolding time was 4 minutes.

According to Comparative Example C1, with the same mold temperature (25° C.) and the same demolding time (4 minutes), the skin of the flexible polyurethane foam prepared by using a blended MDI (component A4, Desmodur® 3133) was peeled, thus, no physical properties have been measured.

According to Comparative Example C2, with the same mold temperature (25° C.), the flexible polyurethane foam prepared by using a blended MDI (Desmodur 3133) will possess good physical and mechanical properties, only when the demolding time was extended to at least 10 minutes.

According to Comparative Example C3, with the same demolding time (4 minutes), the flexible polyurethane foam prepared by using a blended MDI (Desmodur 3133) will possess good physical and mechanical properties, only when the mold temperature was risen to 60° C.

Therefore, in accordance with the amount of Components provided in the present invention, the flexible polyurethane foam can be prepared by the reaction between the isocyanate-terminated prepolymer provided in the present invention and polyols, by using fewer energy consumption and fewer demolding time. The obtained flexible polyurethane foam possesses good physical and mechanical properties.

Example 7 and Comparative Example C4-C5

Under the reaction condition listed in the table 2, flexible polyurethane foam was obtained by the reaction between the isocyanate-terminated prepolymer (A3) and the component B and C in accordance with the amounts listed in table 2. The physical and mechanical properties of the obtained flexible polyurethane foam were listed in the table 2.

TABLE 2

Preparation of flexible polyurethane foam

| | | Example | | |
|---|---|---|---|---|
| | | 7 | C4 | C5 |
| Component A | | A3 | A5 | A5 |
| | Polyol 3 (wt. %) | 85 | 85 | 85 |
| | Polyol 4 (wt. %) | 15 | 15 | 15 |
| | Polyol 1 (wt. %) | 2 | 2 | 2 |
| Component B | DEOA (wt. %) | 2 | 2 | 2 |
| | Catalyst (wt. %) | 0.2 | 0.2 | 0.2 |
| | B8715 (wt. %) | 0.8 | 0.8 | 0.8 |
| Component C | Water (wt. %) | 3.2 | 3.2 | 3.2 |
| Reaction condition | Mold temperature (° C.) | 25 | 55 | 25 |
| | Demolding time (min) | 4 | 4 | 4 |
| | NCO index (%) | 90 | 90 | 90 |
| | Density (kg/m$^3$) | 51.8 | 52.7 | |
| | IFD 25% (N) | 330 | 397 | |
| | Ball rebound (%) | 56 | 59 | Peel skin/ coarse skin |
| Physical properties | Tensile strength (kPa) | 133 | 130 | |
| | Elongation at break (%) | 87 | 85 | |
| | CFD 40% (Kpa) | 7.3 | 8.8 | |
| | C. S (%) (22 h, 70 C.) | 4.5 | 6.5 | |
| | Wet CS 50% (95%, 50 C.) | 7.9 | 13.1 | |

According to Table 2, the prepolymer (A3) provided in the present invention was reacted with the component B and C to prepare a flexible polyurethane foam, wherein the mold temperature was 25° C. and the demolding time was 4 minutes.

According to Comparative Example C4, with the same demolding time (4 minutes), the flexible polyurethane foam can be prepared by using a MDI prepolymer (component A5, Desmodur® 20IK45), only when the mold temperature was risen to 55° C.

According to Comparative Example C5, with the same mold temperature (25° C.) and the same demolding time (4 minute), the surface of the flexible polyurethane foam prepared by using a MDI prepolymer (component A5, Desmodur® 20IK45) was peeled.

Therefore, flexible polyurethane foam with good surface can not be prepared by using an ordinary isocyanate-terminated prepolymer (e.g. Desmodur® 20IK45) at a relative low mold temperature. Furthermore, in accordance with the amount of components provided in the present invention, the flexible polyurethane foam can be prepared by the reaction between the isocyanate-terminated prepolymer provided in the present invention and polyols, by using fewer energy consumption and fewer demolding time. The obtained flexible polyurethane foam possesses good physical and mechanical properties.

Although the present invention is illustrated through Examples, it is not limited by these Examples in any way. Without departing from the spirit and scope of this invention, those skilled in the art can make any modifications and alternatives. And the protection of this invention is based on the scope defined by the claims of this application.

The invention claimed is:

1. An isocyanate-terminated prepolymer, wherein the isocyanate-terminated prepolymer comprises the reaction product of reaction components of a1, a2 and a3:
   a1) 52-54% by weight of diphenylmethane diisocyanate (MDI), based on 100% by weight of the isocyanate-terminated prepolymer, wherein the diphenylmethane diisocyanate (MDI) comprises 73-79% by weight of 4,4'-diphenylmethane diisocyanate, based on 100% by weight of the diphenylmethane diisocyanate (MDI),
   a2) 34-36% by weight of polymethylene polyphenyl polyisocyanate (PMDI), based on 100% by weight of the isocyanate-terminated prepolymer, wherein the polymethylene polyphenyl polyisocyanate (PMDI) has an average functionality of from 2.6 to 2.8, and
   a3) 10-13% by weight of polyoxyethylene-polyoxypropylene polyol, based on 100% by weight of the isocyanate-terminated prepolymer, wherein the average functionality of the polyoxyethylene-polyoxypropylene polyol is 2-6, the average molecular weight is 2000-10000, and the average ethylene oxide content of the polyoxyethylene-polyoxypropylene polyol is 24-40% by weight, based on 100% by weight of the polyoxyethylene-polyoxypropylene polyol,
wherein, the NCO content of the isocyanate-terminated prepolymer is 27-30% by weight, based on 100% by weight of the isocyanate-terminated prepolymer.

2. The isocyanate-terminated prepolymer as claimed in claim 1, wherein the average ethylene oxide content of the polyoxyethylene-polyoxypropylene polyol is 24-37% by weight, based on 100% by weight of the polyether polyol.

3. A method for preparing an isocyanate-terminated prepolymer, comprising the step of reacting components of a1, a2 and a3:
   a1) 52-54% by weight of diphenylmethane diisocyanate (MDI), based on 100% by weight of the isocyanate-terminated prepolymer, wherein the diphenylmethane diisocyanate (MDI) comprises 73-79% by weight of 4,4'-diphenylmethane diisocyanate, based on 100% by weight of the diphenylmethane diisocyanate (MDI),
- a2) 34-36% by weight of polymethylene polyphenyl polyisocyanate (PMDI) having an average functionality of from 2.6 to 2.8, based on 100% by weight of the isocyanate-terminated prepolymer, and
- a3) 10-13% by weight of polyoxyethylene-polyoxypropylene polyol, based on 100% by weight of the isocyanate-terminated prepolymer, wherein the average functionality of the polyoxyethylene-polyoxypropylene polyol is 2-6, the average ethylene oxide content of the polyoxyethylene-polyoxypropylene polyol is 24-40% by weight, based on 100% by weight of the polyoxyethylene-polyoxypropylene polyol,
- wherein the NCO content of the isocyanate-terminated prepolymer is 27-30% by weight, based on 100% by weight of the isocyanate-terminated prepolymer.

4. The method as claimed in claim 3, wherein the average ethylene oxide content of the polyoxyethylene-polyoxypropylene polyol is 24-37% by weight, based on 100% by weight of the polyether polyol.

5. A method for preparing a flexible polyurethane foam comprising the step of reacting components of A, B and C:
- A) isocyanate-terminated prepolymer as claimed in claim 1 or 2,
- B) polyol, comprising;
  - b1) 0.1-20 weight parts of at least a first polyoxyethylene-polyoxypropylene polyol, based on 100% by weight of B and C, wherein the functionality of the first polyoxyethylene-polyoxypropylene polyol is equal to or more than 2, the average ethylene oxide content of the first polyoxyethylene-polyoxypropylene polyol is equal to or more than 50% by weight,
  - b2) 30-90 weight parts of a second polyoxyethylene-polyoxypropylene polyol, based on 100% by weight of B and C, wherein the hydroxyl value of the second polyoxyethylene-polyoxypropylene polyol is 25-40 mg/KOH, the average ethylene oxide content of the second polyoxyethylene-polyoxypropylene polyol is equal to or less than 30% by weight,
  - b3) 5-60 weight parts of polymer polyol,
  - b4) 0.01-15 weight parts of chain extender,
  - b5) 0.01-20 weight parts of catalyst and/or foam stabilizer, and
- C) 0.1-7 weight parts of water, wherein the NCO index of the reaction is 70-120.

6. The method as claimed in claim 5, wherein the reaction of reaction components A, B and C is carried out in a mould, and the mould temperature is 15-40° C.

* * * * *